United States Patent
Smith

(10) Patent No.: US 7,245,214 B2
(45) Date of Patent: Jul. 17, 2007

(54) ELECTRONICALLY TRACKING A PATH HISTORY

(75) Inventor: Michael R. Smith, Wichita, KS (US)

(73) Assignee: User-Centric IP, LP, Wichita, KS (US)

( * ) Notice: Subject to any disclaimer, the term of this patent is extended or adjusted under 35 U.S.C. 154(b) by 250 days.

(21) Appl. No.: 11/052,295

(22) Filed: Feb. 8, 2005

(65) Prior Publication Data

US 2006/0187027 A1 Aug. 24, 2006

(51) Int. Cl.
*G08B 1/08* (2006.01)
*G08G 1/01* (2006.01)
*G01S 3/02* (2006.01)
*G01C 21/00* (2006.01)
*G05D 1/02* (2006.01)

(52) U.S. Cl. .............................. 340/539.13; 340/539.1; 340/539.2; 340/933; 342/451; 342/457; 701/300; 701/213; 701/216; 701/217; 701/226

(58) Field of Classification Search ...................... None
See application file for complete search history.

(56) References Cited

U.S. PATENT DOCUMENTS

| | | | |
|---|---|---|---|
| 6,024,655 A * | 2/2000 | Coffee | ......................... 473/407 |
| 6,505,123 B1 | 1/2003 | Root et al. | |
| 6,754,585 B2 | 6/2004 | Root et al. | |
| 6,826,481 B2 | 11/2004 | Root et al. | |
| 6,836,730 B2 | 12/2004 | Root et al. | |
| 6,941,126 B1 | 9/2005 | Jordan, Jr. | |
| 6,980,909 B2 | 12/2005 | Root et al. | |
| 6,985,813 B2 | 1/2006 | Root et al. | |
| 6,988,037 B2 | 1/2006 | Root et al. | |
| 7,024,310 B2 | 4/2006 | Root et al. | |
| 2005/0050008 A1 | 3/2005 | Root et al. | |
| 2006/0080039 A1 | 4/2006 | Root et al. | |
| 2006/0161469 A1 | 7/2006 | Root et al. | |

* cited by examiner

*Primary Examiner*—Julie Bichngoc Lieu
(74) *Attorney, Agent, or Firm*—Banner & Witcoff, Ltd.

(57) ABSTRACT

Methods and systems for electronically tracking the progress of teams as they cover an assigned geographic area are described herein. A server computer establishes a coverage area, divides the coverage area into a plurality of regions, and assigns each region to a team. Each team carries a tracking device capable of autonomously determining its present location without user assistance, thus allowing the team to focus on the assigned task, such as searching for a missing person, plowing a field, paving a road, etc. The server monitors the location of each tracking device as each team covers its assigned region, and updates on a visually displayed geographic map a historical path associated with each tracking device based on the monitored location of each tracking device. In this manner, users can quickly view the visual depiction of the historical to determine as yet uncovered areas.

35 Claims, 5 Drawing Sheets

ELECTRONICALLY TRACKING A PATH HISTORY

FIELD OF THE INVENTION

The invention relates generally to electronic tracking of paths traversed by a person or vehicle. More specifically, the invention provides a method and system for electronically tracking paths traversed and visually displaying the path history to illustrate areas which have and have not been traversed.

BACKGROUND OF THE INVENTION

Search and rescue operations commence whenever a person is reported as missing. The search and rescue operations typically entail identifying or approximating a last known location of the missing person, and initiating a physical search based on the identified position. However, there often is a lack of accurate recordkeeping of those areas that have been searched, resulting in the same area being searched twice, and not searching altogether in other areas (i.e., there are gaps in the search area).

Similarly, farmers often have difficulty ensuring that an entire field has been prepared for planting, or even that seed has been thrown over an entire field during the planting process. Road crews often manually keep track of sections of road that have been treated or prepared for some work to be done, and thus often miss sections of road entirely, and treat or prepare other sections twice.

Thus, it would be an advancement in the art to provide a location-based tracking system that can detect and monitor a person or vehicle's historical path and visually display the path history to illustrate area that have been traversed by the person or vehicle versus those areas that have not been traversed by the person or vehicle.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, an aspect of the present invention is directed to method for tracking a history of search patterns of a search and rescue operation. The method may include establishing a search area based on a last known location or point of disappearance of a missing person, dividing the search area among search teams each equipped with an appropriate tracking device as described herein, monitoring the location of each search team's tracking device as each search team searches its assigned region, and updating on a visually displayed geographic map a search trail associated with each search team's tracking device based on the monitored location of each search tracking device.

According to another aspect of the invention, a tracking device may include a processor, a transceiver for communicating with a search and rescue control center, a display screen for outputting a visually displayed geographic map, and memory storing computer executable instructions which, when executed by the processor, cause the tracking device to perform a method for tracking a history of search patterns of a search and rescue operation. The method may include determining a search region of the tracking device and displaying the search region on the visually displayed geographic map; monitoring, at regular intervals, a location of the tracking device as it is carried by a search team searching the search region; and updating the visually displayed geographic map with a search trail corresponding to the monitored location of the tracking device.

According to another aspect of the invention, a search and rescue command center may use a computer system having a processor controlling overall operation of the system, a display device that outputs a visual depiction of a geographic map of a search area, and memory storing computer executable instructions for performing a method for tracking a history of search patterns of a search and rescue operation. The method may include establishing the search area; dividing the search area into a plurality of regions; assigning each region to one of a plurality of search teams, wherein each search team is associated with a tracking device; monitoring a location of each tracking device as each search team searches its assigned region; and updating on the visual depiction of the geographic map of the search area a search trail associated with each search tracking device based on the monitored location of each tracking device in the monitoring step.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Figure 1:
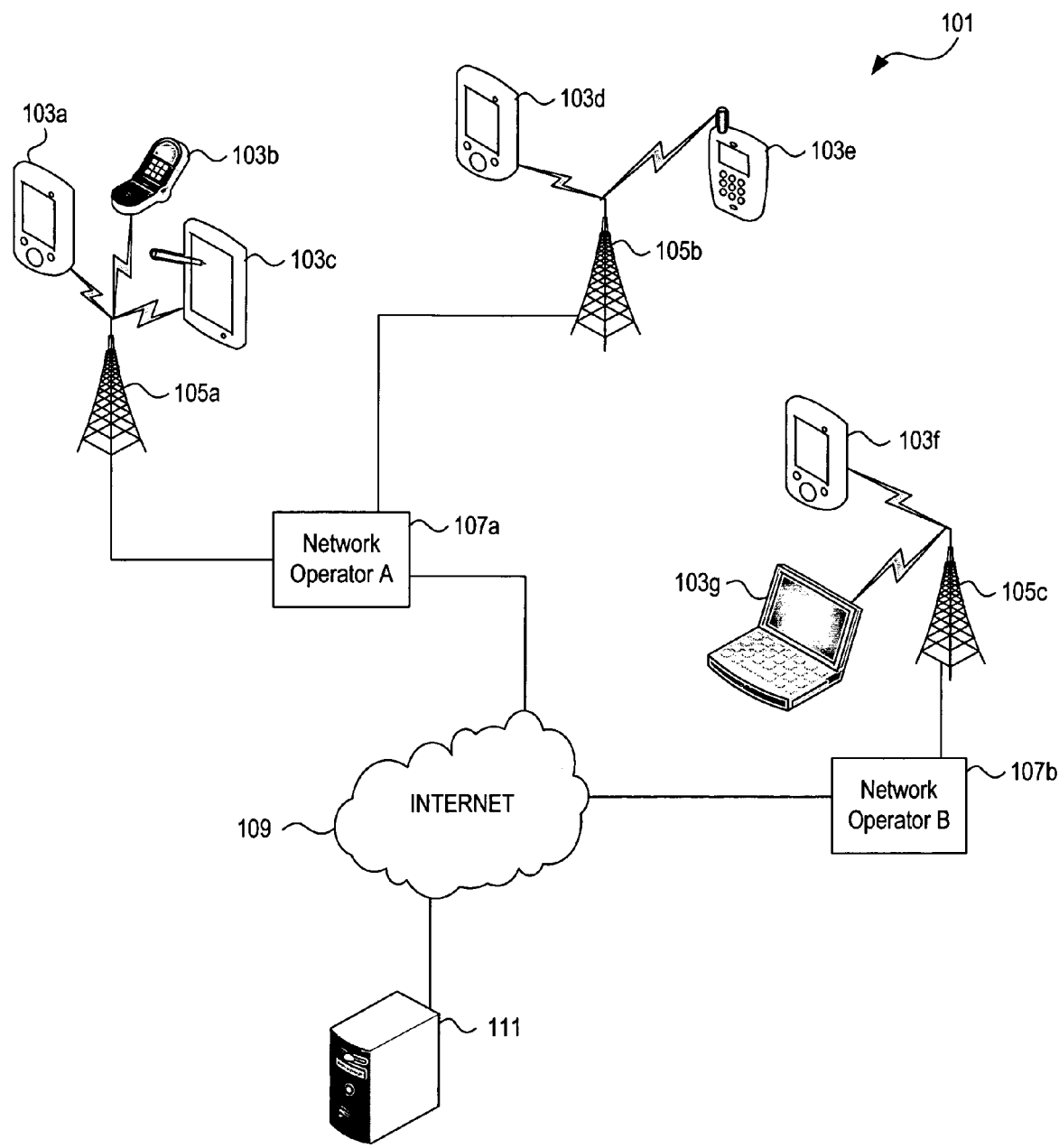
FIG. 1 illustrates a network architecture that may be used for one or more aspects of the invention according to an illustrative embodiment of the invention.

FIG. 1 illustrates a sample network architecture that may be used to perform one or more aspects of the invention. In FIG. 1, multiple tracking devices 103a-103g (collectively and generically referred to as tracking device 103) have wireless communications capabilities to send and receive data. Each tracking device 103 may be any device that has two-way data communications, for example, a mobile phone, personal digital assistant, smart phone, tablet- or pen-based computer, laptop or palmtop computer, or other suitable device. Tracking devices 103 may communicate through wireless communication towers 105a, 105b, 105c (collectively/generically, 105). Each wireless communication tower 105 is operated by a wireless network operator 107a, 107b (collectively/generically, 107) to relay communications to and from a command center server 111, and/or others, via a data network 109, such as the Internet. Those of skill in the art will appreciate that various network architectures and topologies may be used to accomplish the same or similar goals as described herein. For example, instead of a terrestrial wireless communications system, one or more tracking devices may communicate via a satellite based wireless communication system, and one or more towers 105 may be replaced with one or more satellites (not shown).

According to an illustrative embodiment of the invention, one or more of tracking devices 103 may be a STORM HAWK® brand handheld GPS mobile information system available from WeatherData, Inc. of Wichita, Kans. According to another illustrative embodiment of the invention, one or more tracking devices 103 may be a device as described in Smith, U.S. Pat. No. 6,845,324, issued Jan. 18, 2005, herein incorporated by reference in its entirety for all purposes. Those of skill in the art will appreciate that any device having the requisite capabilities as described herein may be used.

Figure 2:
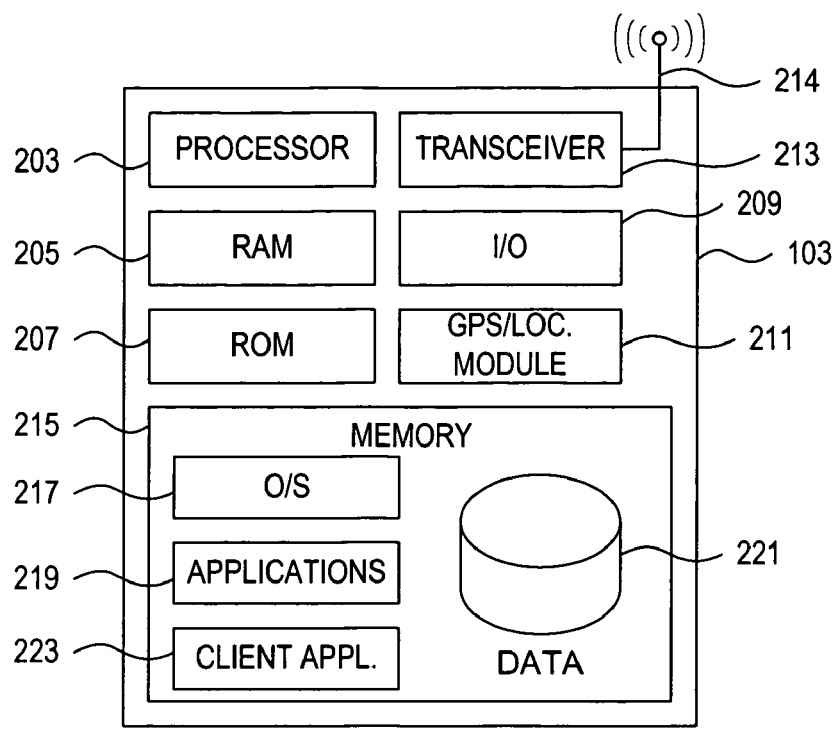
FIG. 2 illustrates a block diagram of a tracking device according to an illustrative embodiment of the invention.

FIG. 2 illustrates a block diagram of a generic tracking device 103 that may be used according to an illustrative embodiment of the invention. Tracking device 103 may have a processor 203 for controlling overall operation of the tracking device and its associated components, including RAM 205, ROM 207, input/output module 209, location module 211, transceiver 213, and memory 215.

I/O 209 may include a keypad, touchscreen, and/or stylus through which a user of device 103 may provide input, and may also include one or more of a speaker for providing audio output and a video display device for providing textual, audiovisual and/or graphical output.

Location module 211 determines the location (e.g., latitude, longitude, and/or altitude) of the tracking device 103. Location module 211 may include a global position system (GPS) receiver to autonomously determine the location of the tracking device using the commercially accessible GPS satellite network. Alternatively, when a network operator providing wireless telecommunication services to tracking device 103 is equipped with E911 location detection capabilities (e.g., mobile device location determination by time difference of arrival (TDOA), angle of arrival (AOA), and/or triangulation technologies, etc.) location module 211 may query the network operator for the location of the tracking device 103. In such a manner, the methods and systems described herein are usable with devices capable of autonomously determining their own location, as well as with devices that work in a network which can determine the location of individual devices with reasonable specificity.

Transceiver 213 includes any component that enables tracking device 103 to wirelessly communicate via antenna 214 with a wireless telecommunications network provided by a network provider. Memory 215 may store software used by tracking device 103, such as an operating system 217, application programs 219, and associated data 221. For example, one application program 221 used by tracking device 103 according to an illustrative embodiment of the invention may be a tracking client application 223, which communicates directly or indirectly with a tracking manager application resident on a central server, such as server 111 (FIG. 1). As described herein, tracking manager is described synonymously with server 111.

The initial example of an illustrative embodiment described below is with respect to search and rescue operations, and is not intended to limit the application of the invention to search and rescue operations, but rather illustrates one of a variety of uses of the present invention. Subsequent examples will follow.

Figure 3:
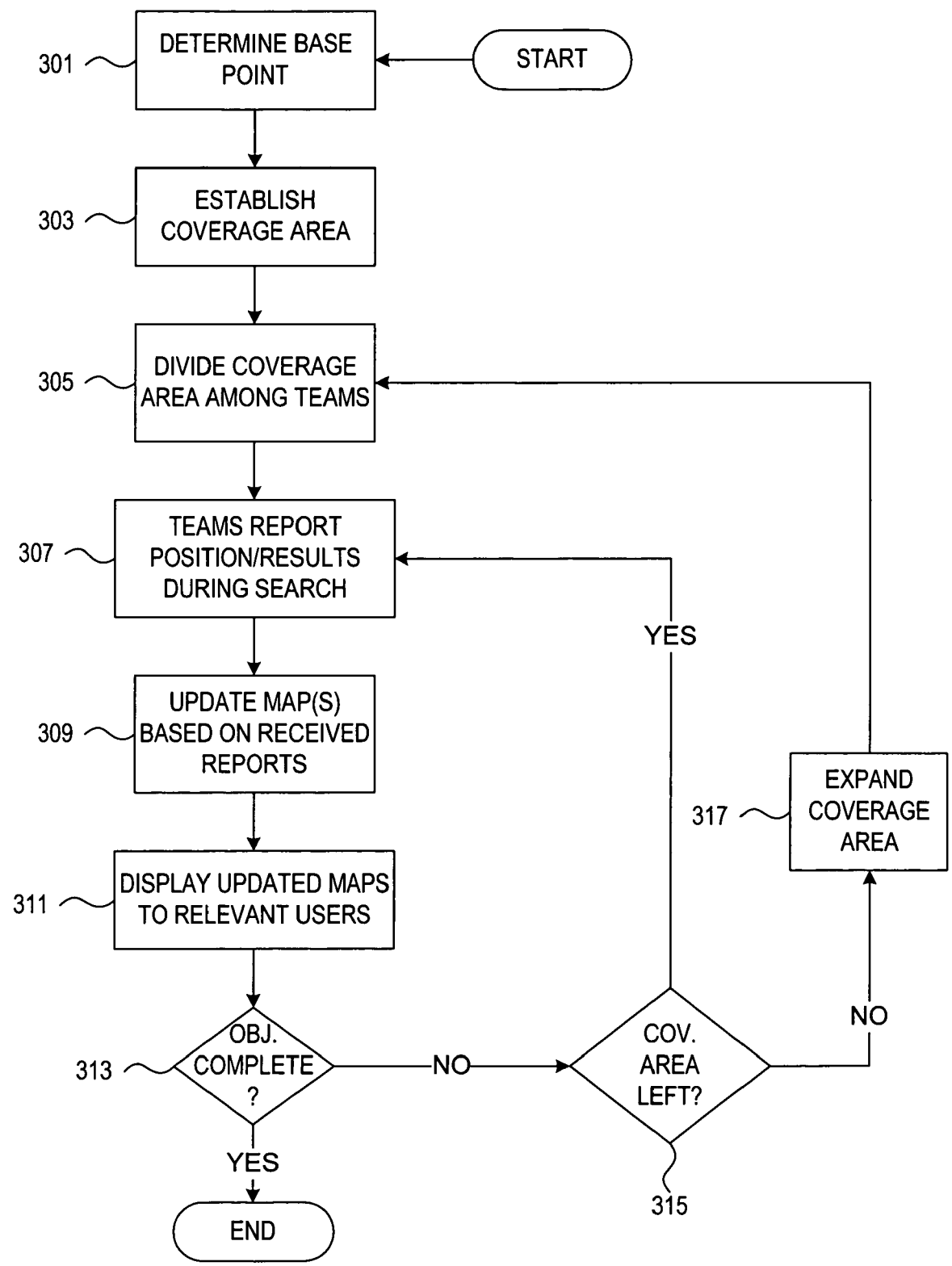
FIG. 3 illustrates a flow chart for tracking search patterns according to an illustrative embodiment of the invention.

With reference to FIG. 1 and FIG. 3, a tracking manager on server 111 may provide overall management of multiple tracking devices 103 as search and rescue operations commence for a missing person. FIG. 3 illustrates a flowchart of a search and rescue management method performed by server 111 according to an illustrative embodiment of the invention. Server 111 may be any computing device that can send and receive communications, directly or indirectly, between multiple tracking devices 103, for example, via the Internet 109 and via one or more network operators 107.

Figure 4:
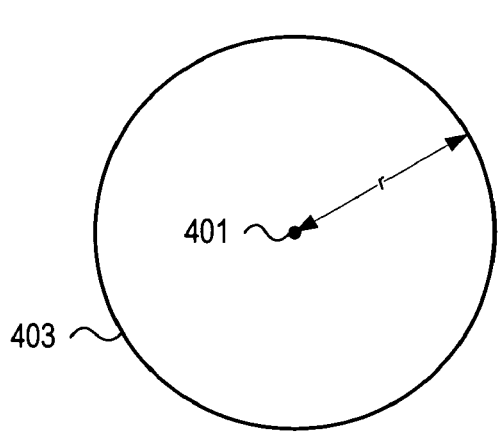
FIG. 4 illustrates a search area according to an illustrative embodiment of the invention.

Server 111 initiates the method in step 301 upon receiving information regarding a base point, here a point of disappearance of a missing person, around which a coverage area will be determined. The point of disappearance may be entered manually as determined or approximated by a human user, or may be calculated automatically based on known information regarding a know path of travel of the missing person and an amount of time since last contact with the missing person. With further reference to FIG. 4, once the point of disappearance 401 is determined, the server 111 in step 303 establishes a coverage area 403 (a search area in the present example) based on the point of disappearance.

For example, the server 111 may establish a circular search area 403 around the point of disappearance 401 with a radius r, where r is based on an estimated amount of time t lapsed since the missing person was estimated to be at the point of disappearance and a rate or speed of travel s with which the missing person is estimated to be moving. Thus, in one example, the radius r may be calculated using the formula $r = t \times s$. Those of skill in the art will appreciate that the search area may be a shape other than circular, and may be established based on other criteria. For example, a rectangular search area may be used, and the size of the search area may be based on a known area in which the missing person is located, rather than based on an amount of lapsed time t and a speed s.

Figure 5:
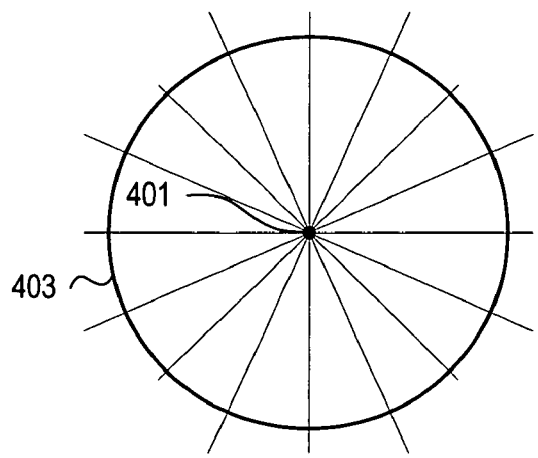
FIG. 5 illustrates a divided search area according to an illustrative embodiment of the invention.
Figure 6:
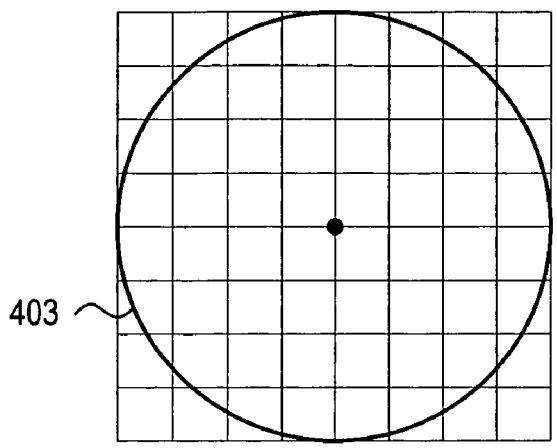
FIG. 6 illustrates another divided search area according to an illustrative embodiment of the invention.

Once the search area 403 has been established, the server 111 in step 305 divides the search area into a plurality of sub-regions (search regions in the present example), and assigns each region to a team (search teams in the present example). Each search team includes one or more people or devices that physically cover an assigned region, and that have a tracking device 103 among them. FIG. 5 illustrates a circular search area 403 split into pie-shaped search regions in such as manner that search teams fan out from the point of disappearance 401. FIG. 6 illustrates an alternative split of search area 403 into a grid of search regions.

Figure 7:
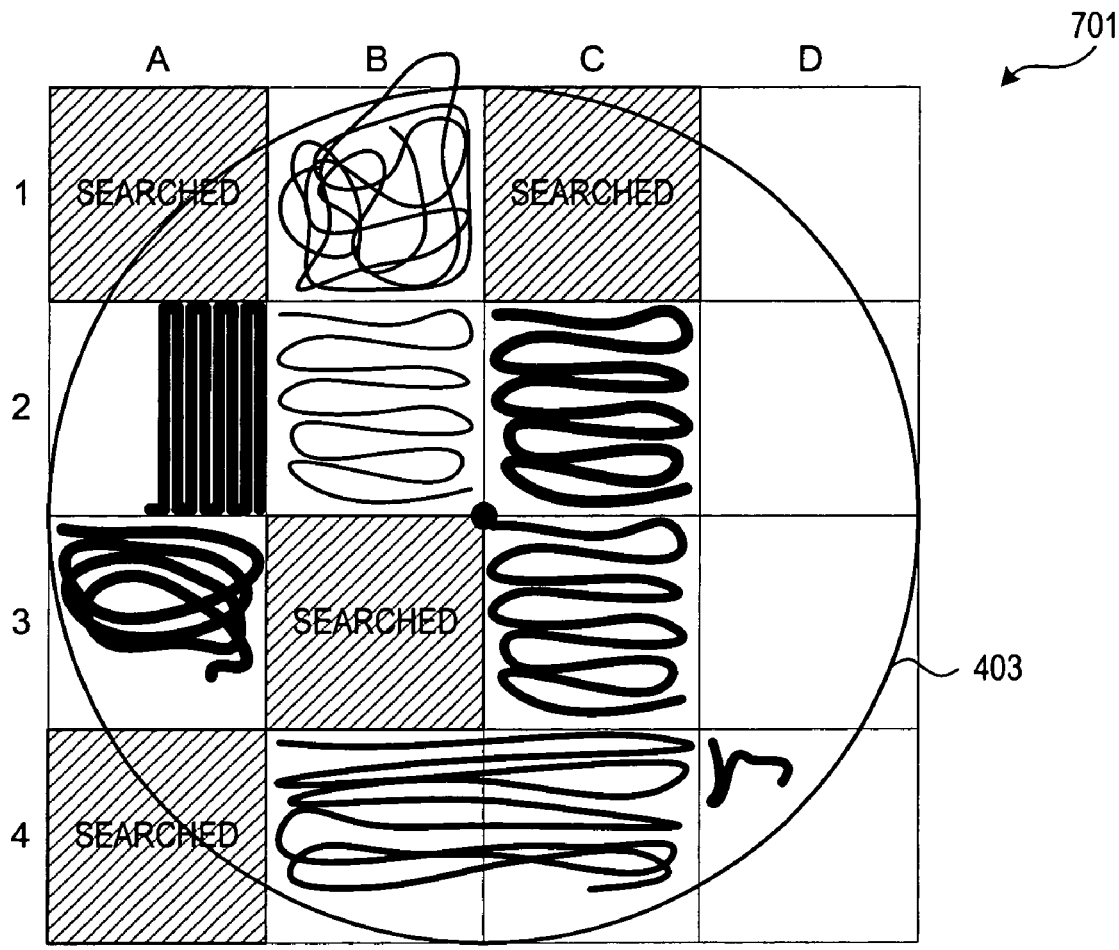
FIG. 7 illustrates a composite search map according to an illustrative embodiment of the invention.

In step 307, while search teams are searching their respectively assigned search regions, each team's tracking device monitors the tracking device's current location and reports the location to the tracking manager at regular intervals. With further reference to FIG. 7, based on the location information received in step 307, the server in step 309 updates a visually depicted geographic map 701 of the coverage area displayed on a display device connected to server 111. The term 'connected,' as used herein, includes both direct connections as well as indirect connections that pass data through one or more intermediate nodes, devices, hops, etc., before reaching the intended destination.

Map 701 may include a visual representation of the coverage area 403, as well as visual cues on the map 701 regarding the search status of each search region, here grid cells A1, A2, A3, A4, B1, B2, B3, B4, C1, C2, C3, C4, D1, D2, D3, and D4. The visual cues displayed on map 701 may include an indication that a region has been fully covered (in the present example, searched), such as is illustrated in FIG. 7 for cells A1, A4, B3, and C1, an indication that a region has not yet been covered at all, such as is illustrated for cells D1, D2, and D3, or an indication that progress in a region is underway, such as is illustrated for cells A2, A3, B1, B2, B4, C2, C3, C4, and D4.

According to an illustrative embodiment of the invention, the visual cue indicating that a search of a region is underway may include a historical trail of a search path undertaken by the search team associated with that region. For example, each of cells A2, A3, B1, B2, B4, C2, C3, C4, and D4 are illustrated with such a historical trail. Each historical trail may be color coded (not illustrated) to correspond to a specific search party. In addition, the width of the historical trail drawn may vary depending on the size of the search party, to account for the width searched by the search party based on its number of people. For example, the trail in cell B2 may represent a search party consisting of a single individual, the trail in cell C3 may represent a search party consisting of two individuals, and the trail in cell C2 may represent a search party consisting of three individuals.

The width of the historical trail may also be adjusted based on other factors, such as the visibility or elevation of the searcher. For example, the width might be narrowest for a searcher on foot in a forest, wider for a searcher on horseback in a cornfield, and wider still for a helicopter based search. The width of the search trail might be narrowed proportionately if a search is conducted in low visibility conditions, such as in fog or blowing dust or sand. In one embodiment each tracking device has a GPS attachment with an accuracy within 8 feet, and thus the minimum width is representative of 8 feet. In other embodiments where location can be determined with greater specificity, e.g., as location technology improves, the trail width may be even narrower. The maximum trail width is limited only by visibility of the search team to which a tracking device is assigned.

Upon the occurrence of certain predefined conditions, the server 111 may change a visual representation of a search region to indicate the entire region has been covered. According to an illustrative embodiment of the invention, for example, the server may automatically change a region to indicate it has been completely covered when the historical trail represents or indicates that the team assigned to that region has been within a predefined distance of every point within that region. If the trail is drawn to indicate those points of which the search team has been within the predefined distance, the server 111 may detect when a region is completely filled in by the historical trail and then indicate that the region has been completely covered. Other criteria may alternatively be used, for example, when a percentage of the region is filled up and/or there are no gaps in the region larger than a predefined size and/or width. For example, assuming the team assigned to cell A2 continues its current search pattern, server 111 may indicate that the region has been completely covered in approximately four additional back-and-forth cycles. In some embodiments the server 111 might leave the historical trail displayed, or provide a query button to allow a user of the server 111 to view a search trail after the server has marked a region as having been completely covered.

Figure 8:
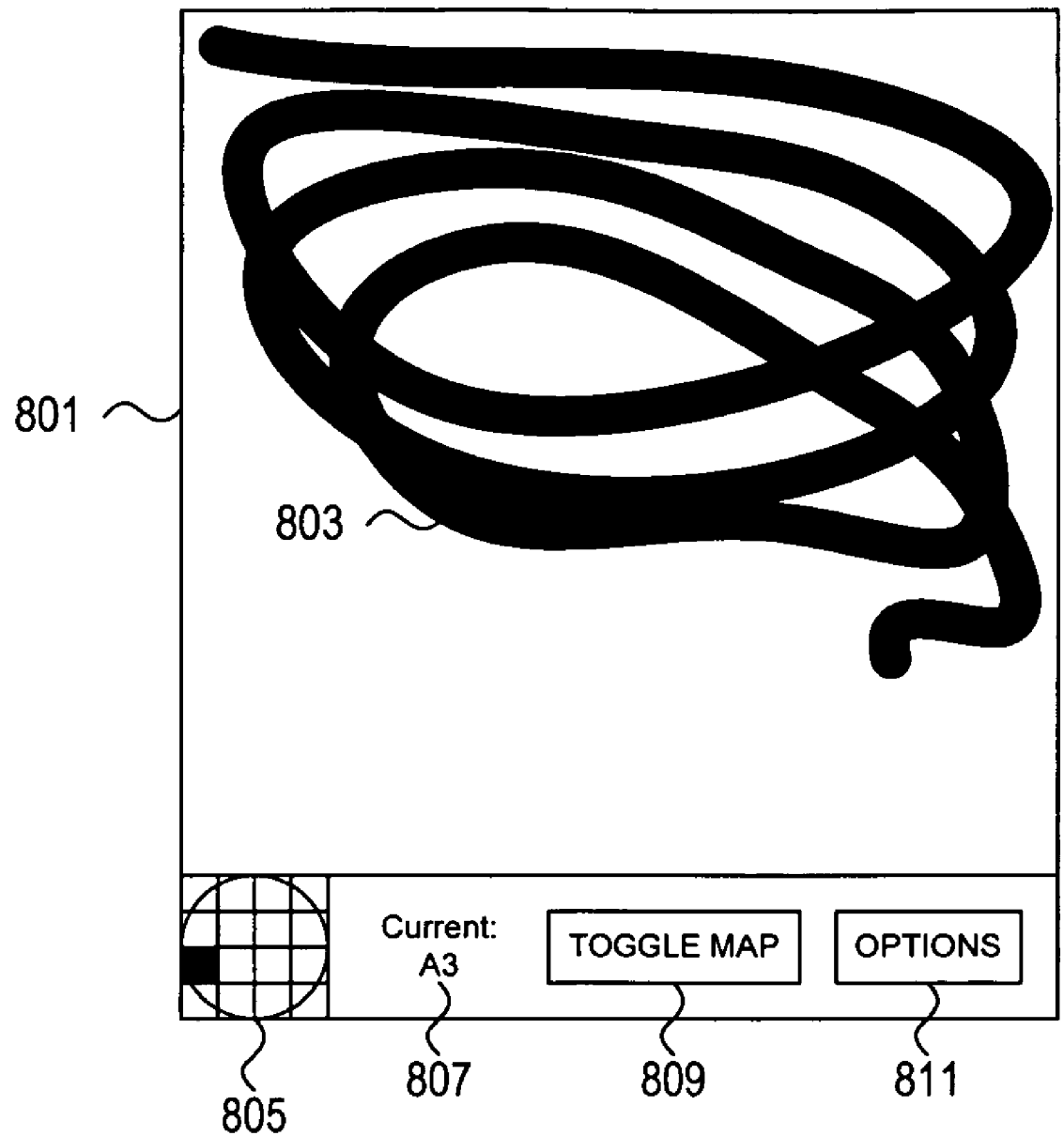
FIG. 8 illustrates a tracking device screen display according to an illustrative embodiment of the invention.

In step 311 each team's tracking device may be updated to display the historical trail of its own path, such as is illustrated in FIG. 8. Thus, between steps 309 and 311, maps are updated both on a display associated with the coordinating central server 111, as well as on displays associated with each tracking device 103. FIG. 8 illustrates a sample screen 801 of a tracking client application on a tracking device 103 associated with the team assigned to cell A3 of FIG. 7. Those of skill in the art will appreciate that not all devices capable of providing information to tracking manager 111 may be capable of displaying information such as is illustrated in FIG. 8, depending on the features of the tracking device 103 (e.g., screen size, graphics capabilities, etc.). Screen 801 may include a visual representation of the team's historical path 803, and may include an icon or graphic 805 indicating the team's assigned region in relation to the entire search area. Screen 801 may also include an indication 807 of the current region, and one or more buttons 809, 811 for other application functionality, e.g., menu, reporting options, features, etc.

In an illustrative embodiment, button 809 may be used, e.g., to toggle between the maps illustrated in FIG. 7 and FIG. 8 where server 111 sends information to the tracking device 103 regarding other tracking devices. Button 811 may be used to obtain an options menu, e.g., to report that an objective is complete (e.g., that the missing person has been found), to send a custom message other than indicating that the objective is complete, to request an update of other tracking device's progress (if not automatically received), to quit the application, etc. For example, where a tracking device is equipped with a camera (not shown), an option might include sending a time-stamped, location-stamped digital photograph depicting someone or something found by the search team. Another option might include reporting hazardous or medical conditions via one or more data messages as taught in U.S. Pat. No. 6,845,324.

In step 313 server 111 determines whether the objective is complete (i.e., whether the missing person has been found, in this example), e.g., by determining whether server 111 has received a message from any tracking device indicating that the missing person has been found. If the objective is complete, the method ends. If the objective is not complete, then in step 315 the server 111 determines whether there is any coverage area remaining to be covered. If so, then server 111 cycles through steps 307-317 again, as applicable. If not, then in step 317 the server 111 expands the coverage area (preferably incrementally each time step 317 is encountered) and cycles through steps 305-317 again, as applicable.

Those of skill in the art will appreciate that not all steps need be performed in the recited order, and one or more steps may be optional. For example, the order of steps 309 and 311 is immaterial, and step 317 may be optional. In other embodiments, step 303 may be delayed or skipped altogether, and search teams may begin searching prior to the establishment of an official search area. In such an embodiment, a search team may provide input into a tracking device to begin tracking based on the search team's present location. Thus, a search team can begin searching upon reaching an anticipated search area without waiting for the server to establish search regions for each search team. Once the server establishes search regions, tracking devices associated with teams that have already begun searching may upload their data regarding areas already searched. These are merely examples of step reordering and optional steps, and are not intended to limit the steps which can be reordered or omitted.

Various modifications and permutations are foreseen and considered within the spirit and scope of the invention. For example, each tracking device may (alternatively or in addition to the server 111) determine when the tracking device has completely searched its assigned region, and output an alert to the user or team member holding the device, and/or send a message to the tracking manager informing that the region has been searched. The message may also optionally request another search region, if any are left, or such a request may be sent in a separate message.

In addition, when any tracking device sends a message to the tracking manager that a missing person has been found, the tracking manager may relay the message to all tracking devices, and inform each team whether any missing persons remain to be located, or whether the search has thus ended because all missing persons have been found. The system may thus be easily modified for use with multiple missing persons at a time.

The methods and systems described herein may also be used for other operations where ensuring that a person or vehicle traverses an entire predefined area can be useful to the success of the operation. For example, a farmer may carry a tracking device 103 in each tractor working a field to ensure that the entire field gets worked. Alternatively, the farmer may use a single tracking device not in communication with a server, but rather one that manages its own progress and historical path information as described herein (i.e., has a standalone mode), or the farmer may even use multiple tracking devices in a peer-to-peer mode or configuration without the use of a central server, where each tracking device communicates with the other tracking devices. Use by a farmer to ensure coverage of a field is also an example of scenario in which steps 301 and/or 303 (FIG. 3) are unnecessary, because the coverage area may already be known (i.e., the field). The objective in such a scenario may simply be to cover the entire field, and thus either of method steps 313 and 315 may be used for this determination, rendering the other method step unnecessary in this example, as well as method step 317.

In another similar example, road crews may carry a tracking device on each paver, bulldozer, steamroller, or other piece of maintenance equipment to ensure that every part of a road is properly maintained. Again, a single road crew might carry a single tracking device in standalone mode, may use multiple tracking devices in peer-to-peer mode, or may use multiple tracking devices managed by a server, thus allowing a management center (e.g., a state's Department of Transportation) to ensure that the work is completed properly over an entire portion of road.

Other illustrative uses include finding stray livestock, locating a weapon of mass destruction (e.g., based on known partial information such as the geographically-assigned prefix of a telephone number assigned to a landline telephone used to make a suspicious telephone call), and locating a missing train in "dark territory" (i.e., territory where there is no signaling system that keeps track of the train's location).

The present invention includes any novel feature or combination of features disclosed herein either explicitly or any generalization thereof. While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

I claim:

1. A method for electronically tracking a historical path, said method comprising:
    (a) establishing a coverage area;
    (b) dividing the coverage area into a plurality of regions;
    (c) assigning each region to one of a plurality of teams, wherein each team is associated with a tracking device;
    (d) receiving electronic transmissions from each tracking device as each team traverses its assigned region, wherein each electronic transmission includes a location of the tracking device from which it is received; and
    (e) updating on a geographic map displayed on a computer display device a historical path associated with each tracking device based on the monitored locations in step (d), wherein a width of each historical path corresponds to a size of the team to which the historical path corresponds.

2. The method of claim 1, further comprising the step of:
    (f) when any team has finished covering its assigned region, updating the finished region on the geographic map displayed on the computer display device to indicate it has been completed.

3. The method of claim 1, further comprising automatically assigning a new region to a team that has finished covering its assigned region.

4. The method of claim 1, wherein step (a) comprises establishing a circular area around a point of disappearance.

5. The method of claim 4, wherein step (b) comprises dividing the circular area into cells.

6. The method of claim 1, wherein step (e) comprises rendering each historical path with a different visual appearance on the visually displayed geographic map.

7. The method of claim 1, further comprising:
    (f) receiving a message from one of the plurality of tracking devices indicating that an objective has been completed, wherein said message comprises a location in which the objective was completed.

8. The method of claim 7, further comprising:
    (g) automatically sending a response message to tracking devices other than the one tracking device from which the message was received, said response message indicating that the objective has been completed.

9. A computer readable medium storing computer executable instructions for performing the method of claim 1.

10. The method of claim 1, wherein the size comprises a number of people.

11. The method of claim 2, further comprising:
(g) determining that a team has finished covering its assigned region by analyzing the team's corresponding current historical path.

12. The method of claim 11, wherein in step (g) analyzing the team's corresponding current historical path comprises determining that the team has been within a predefined distance of every location within the team's assigned region.

13. The method of claim 11, wherein in step (g) analyzing the team's corresponding current historical path comprises determining that the historical path covers a predefined minimum percentage of the team's assigned region.

14. The method of claim 13, wherein the predefined minimum percentage is one-hundred percent.

15. The method of claim 11, wherein in step (g) analyzing the team's corresponding current historical path comprises determining that there are no gaps in the historical path larger than a predefined maximum allowed gap size.

16. The method of claim 15, wherein the predefined maximum gap size comprises a maximum allowed gap width.

17. The method of claim 1, further comprising the step of outputting an alert by a tracking device when the tracking device determines that its assigned team has finished covering the team's assigned region.

18. A tracking device, comprising:
a processor,
a display screen for outputting a visually displayed geographic map;
memory storing computer executable instructions which, when executed by the processor, cause the tracking device to perform a method for electronically tracking a historical path, said method comprising:
(a) determining a geographic region to be monitored by the tracking device and displaying the region on the visually displayed geographic map;
(b) monitoring at regular intervals, a location of the tracking device as it is carried by a team covering the assigned region; and
(c) updating the visually displayed geographic map with a historical path corresponding to the monitored locations of the tracking device, wherein a width of the historical path corresponds to a size the team.

19. The tracking device of claim 18, further comprising a location module capable of determining the location of the tracking device, and wherein step (b) comprises receiving the location from the location module.

20. The tracking device of claim 18, wherein step (b) comprises receiving the location from a wireless network operator.

21. The tracking device of claim 18, wherein step (b) comprises wirelessly sending the location of the tracking device to a server.

22. The tracking device of claim 18, wherein the computer executable instructions further comprise displaying on the display screen a graphic indicating the region of the tracking device as compared with a coverage area corresponding to multiple tracking devices.

23. The tracking device of claim 18, wherein the computer executable instructions further comprise:
(d) receiving coverage information corresponding to a plurality of tracking devices;
(e) displaying on the display screen a coverage area, wherein the coverage area is divided in regions bases on the received coverage information; and
(f) displaying in each region a historical path corresponding to a monitored location of a tracking device associated with that region, as received in the coverage information, wherein a width of each historical path corresponds to a size of the team to which the historical path corresponds.

24. The tracking device of claim 18, wherein the computer executable instructions further comprise:
(d) automatically detecting, based on step (b), when the team has completed covering its assigned region, and outputting an alert as a result of the detection.

25. The tracking device of claim 24, wherein step (d) comprises determining when an entire field has been covered by a piece of farming machinery.

26. The tracking device of claim 24, wherein step (d) comprises determining when a search and rescue team has searched its assigned region.

27. The tracking device of claim 24, wherein step (d) comprises determining when a road crew has treated a predefined portion of a road.

28. The tracking device of claim 18, wherein the computer executable instructions further comprise:
(d) receiving user input indicating that an objective has been completed prior to covering the entire assigned region; and
(e) automatically sending a message to a server based on step (d).

29. The tracking device of claim 18, wherein the computer executable instructions further comprise:
(d) receiving a message indicating that an objective has been completed; and
(e) outputting an alert as a result of step (d).

30. The tracking device of claim 18, wherein step (a) comprises receiving geographic region information as input from a user of the tracking device.

31. The tracking device of claim 18, further comprising a transceiver, and wherein step (a) comprises wirelessly receiving geographic region information from a server.

32. The tracking device of claim 18, further comprising a transceiver, and wherein the method for electronically tracking a historical path further comprises communicating location information via the transceiver between the tracking device and a second tracking device.

33. The tracking device of claim 18, wherein step (a) comprises receiving user input identifying the geographic area.

34. The tracking device of claim 18, wherein step (a) comprises receiving user input identifying the geographic area based on a present location of the tracking device.

35. A computer system, comprising:
a processor controlling overall operation of the system;
a display device that outputs a visual depiction of a geographic map of a search area;
memory storing computer executable instructions for performing a method for tracking a history of search patterns of a search and rescue operation, said method comprising:
(a) establishing the search area based on a point of disappearance;
(b) dividing the search area into a plurality of regions;
(c) assigning each region to one of a plurality of search teams, wherein each search team is associated with a tracking device;
(d) monitoring a location of each tracking device as each search team searches its assigned region;
(e) updating on the visual depiction of the geographic map of the search area a search trail associated with each search tracking device based on the monitored location of each tracking device in step (d);

(f) receiving user input indicating that a missing person has been found prior to searching the entire assigned region; and (g) automatically sending a message to a server based on step (f), including a location in which the missing person was found.

* * * * *